US012613787B2

(12) United States Patent
Taira et al.

(10) Patent No.: US 12,613,787 B2
(45) Date of Patent: Apr. 28, 2026

(54) INFORMATION PROCESSING APPARATUS AND CONTROL METHOD UTILIZING A REFERENCE TABLE TO CONTROL A HEAT DISSIPATION FAN BASED ON TEMPERATURE DATA

(71) Applicant: Lenovo (Singapore) Pte. Ltd., Singapore (SG)

(72) Inventors: Yusuke Taira, Kanagawa (JP); Yasuhiro Goto, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 435 days.

(21) Appl. No.: 18/297,771

(22) Filed: Apr. 10, 2023

(65) Prior Publication Data

US 2023/0342273 A1 Oct. 26, 2023

(30) Foreign Application Priority Data

Apr. 22, 2022 (JP) ................................. 2022-070655

(51) Int. Cl.
*G06F 1/20* (2006.01)
*G06F 11/30* (2006.01)

(52) U.S. Cl.
CPC .......... *G06F 11/3034* (2013.01); *G06F 1/206* (2013.01); *G06F 11/3058* (2013.01)

(58) Field of Classification Search
CPC .................................................... G06F 1/206
See application file for complete search history.

(56) References Cited

U.S. PATENT DOCUMENTS

| | | | | |
|---|---|---|---|---|
| 2014/0063721 A1* | 3/2014 | Herman | ............... | H05K 7/1487 |
| | | | | 236/47 |
| 2014/0240913 A1 | 8/2014 | Vyshetsky | | |
| 2017/0276419 A1* | 9/2017 | Jeong | ................... | F25D 11/006 |

(Continued)

FOREIGN PATENT DOCUMENTS

| | | |
|---|---|---|
| JP | 2010-073995 A | 4/2010 |
| JP | 2014-078199 A | 5/2014 |

(Continued)

OTHER PUBLICATIONS

Extended European Search Report issued in corresponding European Patent Application No. 23163064.1, dated Sep. 26, 2023 (10 pages).

*Primary Examiner* — Suresh Suryawanshi
(74) *Attorney, Agent, or Firm* — Osha Bergman Watanabe & Burton LLP

(57) ABSTRACT

An information processing apparatus includes: a processor; a controller; a solid-state storage device; and a heat dissipation fan. The processor and the controller are connected with the solid-state storage device by using a bus, and the solid-state storage device is installed at a position corresponding to the heat dissipation fan. The processor acquires identification information of the solid-state storage device in association with location information indicating the position of the solid-state storage device, and the controller acquires identification information and a logical address of the solid-state storage device in advance, configures a reference table by associating location information corresponding to an identification number with a logical address corresponding to the identification information.

7 Claims, 10 Drawing Sheets

(56) References Cited

U.S. PATENT DOCUMENTS

| | | | |
|---|---|---|---|
| 2018/0189221 A1 | 7/2018 | Morning-Smith et al. | |
| 2018/0260007 A1* | 9/2018 | Ping | G11B 33/142 |
| 2018/0359882 A1 | 12/2018 | Lovicott et al. | |
| 2020/0301489 A1 | 9/2020 | Ping | |
| 2022/0326862 A1* | 10/2022 | Chen | G06F 3/0659 |

FOREIGN PATENT DOCUMENTS

| | | | | |
|---|---|---|---|---|
| JP | 2015-088672 A | | 5/2015 | |
| JP | 2016-206844 A | | 12/2016 | |
| JP | 2017026469 A | * | 2/2017 | |
| JP | 2017-084148 A | | 5/2017 | |
| JP | 2018-94802 A | | 6/2018 | |
| JP | 2020-004233 A | | 1/2020 | |
| WO | WO-2018168287 A1 | * | 9/2018 | G01K 7/00 |

* cited by examiner

| PIN NO. | SIGNAL NAME | TERMINATION | I/O | VOLTAGE LEVEL |
|---|---|---|---|---|
| 44 | ALERT# | OPEN-DRAIN OUTPUT USING PULL-UP RESISTOR ON PLATFORM | O | 0 - 1.8 V |
| 42 | SMB DATA | OPEN-DRAIN OUTPUT USING PULL-UP RESISTOR ON PLATFORM | I/O | 0 - 1.8 V |
| 40 | SMB CLK | OPEN-DRAIN OUTPUT USING PULL-UP RESISTOR ON PLATFORM | I/O | 0 - 1.8 V |

Figure 6:
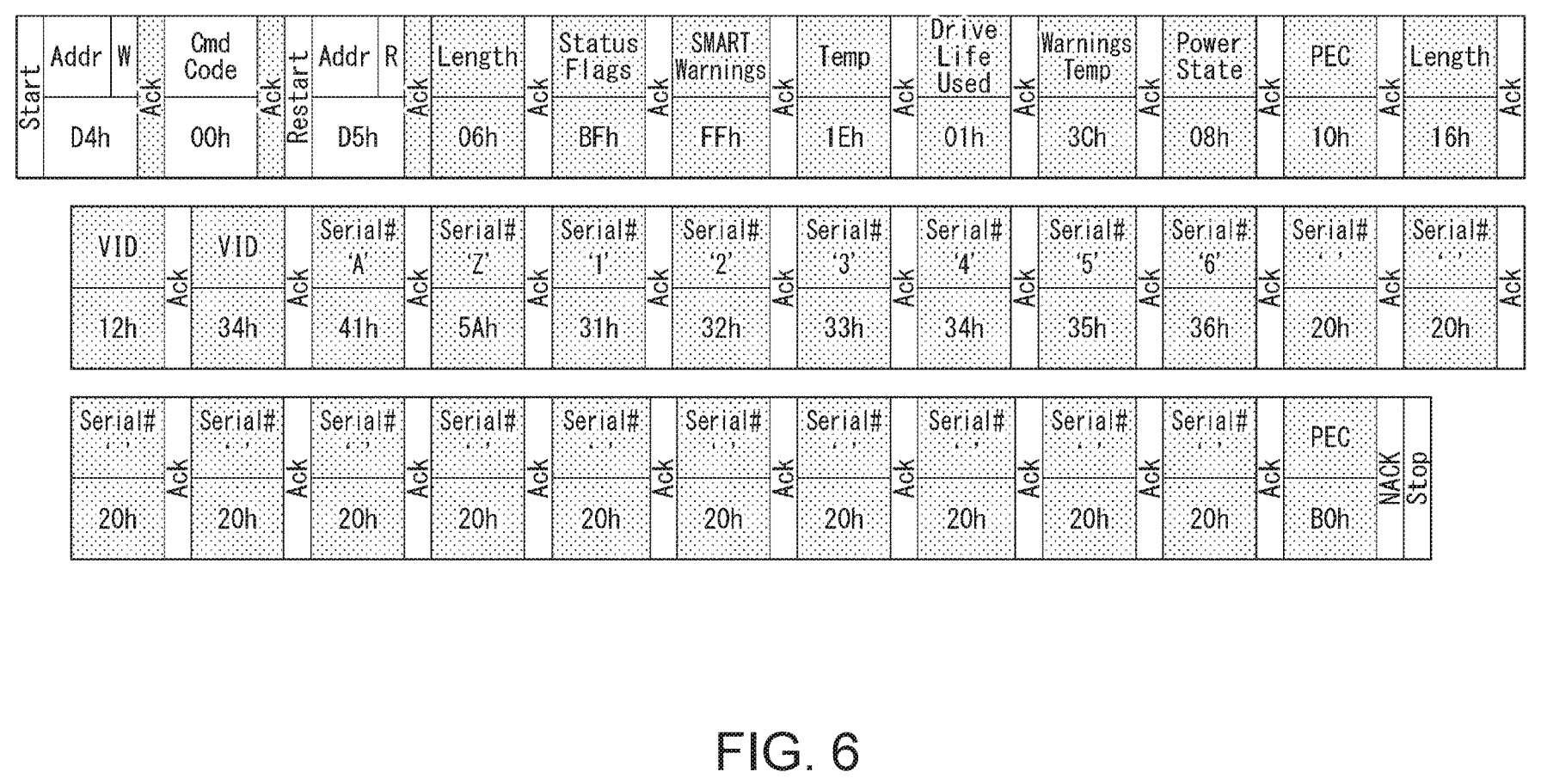

| Start | Addr W | Ack | Cmd Code | Ack | Restart | Addr R | Ack | Length | Ack | Status Flags | Ack | SMART Warnings | Ack | Temp | Ack | Drive Life Used | Ack | Warnings Temp | Ack | Power State | Ack | PEC | Ack | Length | Ack |
|---|---|---|---|---|---|---|---|---|---|---|---|---|---|---|---|---|---|---|---|---|---|---|---|---|---|
| | D4h | | 00h | | | D5h | | 06h | | BFh | | FFh | | 1Eh | | 01h | | 3Ch | | 08h | | 10h | | 16h | |

| VID | Ack | VID | Ack | Serial# 'A' | Ack | Serial# 'Z' | Ack | Serial# '1' | Ack | Serial# '2' | Ack | Serial# '3' | Ack | Serial# '4' | Ack | Serial# '5' | Ack | Serial# '6' | Ack | Serial# '.' | Ack | Serial# '.' | Ack |
|---|---|---|---|---|---|---|---|---|---|---|---|---|---|---|---|---|---|---|---|---|---|---|---|
| 12h | | 34h | | 41h | | 5Ah | | 31h | | 32h | | 33h | | 34h | | 35h | | 36h | | 20h | | 20h | |

| Serial# '.' | Ack | Serial# '.' | Ack | Serial# '.' | Ack | Serial# '.' | Ack | Serial# '.' | Ack | Serial# '.' | Ack | Serial# '.' | Ack | Serial# '.' | Ack | Serial# '.' | Ack | Serial# '.' | Ack | PEC | NACK | Stop |
|---|---|---|---|---|---|---|---|---|---|---|---|---|---|---|---|---|---|---|---|---|---|---|
| 20h | | 20h | | 20h | | 20h | | 20h | | 20h | | 20h | | 20h | | 20h | | 20h | | B0h | | |

| SLEEPING STATE | D STATE | L STATE | SSD OPERATION STATE | SSD RESPONSE |
|---|---|---|---|---|
| S0 | D0 | L0 | OPERATING | ACCESSIBLE |
| | | L1 | OPERATING | ACCESSIBLE |
| | | L1.2 | NON-OPERATING | DEPENDENT ON MODEL |
| S3 | D0 | L1.2 | NON-OPERATING | INACCESSIBLE |
| S0i3 | D0 | L1.2 | NON-OPERATING | INACCESSIBLE |
| | D3.hot | L1.2 | NON-OPERATING | INACCESSIBLE |
| | D3.cold | OFF | NON-OPERATING | INACCESSIBLE |
| S4 | OFF | OFF | NON-OPERATING | INACCESSIBLE |
| S5 | OFF | OFF | NON-OPERATING | INACCESSIBLE |

FIG. 11

INFORMATION PROCESSING APPARATUS AND CONTROL METHOD UTILIZING A REFERENCE TABLE TO CONTROL A HEAT DISSIPATION FAN BASED ON TEMPERATURE DATA

CROSS REFERENCE TO RELATED APPLICATIONS

This application claims priority to Japanese Patent Application No. 2022-70655 filed Apr. 22, 2022, the contents of which are hereby incorporated herein by reference in their entirety.

BACKGROUND OF THE INVENTION

Field of the Invention

The present invention relates to an information processing apparatus and a control method, e.g., an auxiliary storage device provided in an information processing apparatus.

Description of the Related Art

Some information processing apparatuses such as a personal computer (PC) are provided with solid-state storage devices (SSDs: Solid State Drives) that store acquired data. SSDs use semiconductor memories to store various types of data, thus achieving faster access than hard disk drives (HDDs) that have conventionally been in widespread use. High-speed SSDs generate significant heat and are easily damaged by heat if operated at high temperatures for a long period of time. This may shorten product life and increase the likelihood of data corruption or loss. Therefore, temperature management of SSDs becomes important.

Consequently, it has been proposed to use a self-monitoring and reporting technology (SMART) function in monitoring the temperatures of SSDs (which may be referred to as "SSD temperatures" in the present application). A temperature sensor is built in or attached to an SSD, and a measured SSD temperature is notified to the main body of an information processing apparatus, and the notified SSD temperature is used to control the operation of a heat dissipation fan so as to cool the SSD that has generated heat. For transmitting temperature data indicating an SSD temperature, a system management bus (SMBus (registered trademark)), for example, is used. The SMBus (registered trademark) is a device-to-device general-purpose communication bus mainly used for system management. The SMBus (registered trademark) is adopted in a typical input/output method such as PCI Express (registered trademark) (PCIe (registered trademark): Peripheral Component Interconnect Express).

By utilizing the self-monitoring and reporting technology function, an SSD temperature measured using the temperature sensor built in an SSD (may be referred to as a "built-in temperature sensor" in the present application) is notified, so that there are no restrictions on the placement of the temperature sensor. On the other hand, when a temperature sensor outside the SSD (may be referred to as an "external temperature sensor") is used, then it is required to place the external temperature sensor sufficiently close to the SSD. The built-in temperature sensor allows a measured temperature to be directly used as an SSD temperature. On the other hand, a temperature measured using an external temperature sensor requires that a difference in SSD temperature due to the placement of the external temperature sensor be considered. In the built-in temperature sensor, a measured SSD temperature is notified in real time. On the other hand, in the case of the external temperature sensor, there is a delay time for heat to be transmitted from an SSD, so that a real-time SSD temperature is not obtained in some cases.

[Patent Document 1] Japanese Unexamined Patent Application Publication No. 2018-094802

SUMMARY OF THE INVENTION

In the case where the self-monitoring and reporting technology function is used, each SSD is identified using a predetermined logical address in an I/O scheme. A logical address is assigned using an address resolution protocol (ARP) each time a host system or an SSD of an information processing apparatus 10 is started up. Such a logical address may be different for each start-up timing. Therefore, in some cases, even if individual SSDs can be distinguished, a specific SSD cannot be identified. Consequently, when cooling a specific SSD that has generated heat, it may not be possible to identify a heat dissipation fan near that specific SSD. In an information processing apparatus provided with a plurality of cooling fans associated with SSDs, all the cooling fans could be operated to prioritize thermal protection. In such a case, the heat dissipation fans for SSDs with low need for heat dissipation would also operate, so that power consumption and noise level would be likely to increase more than necessary.

Further, when the operation mode of the main body (host) of the information processing apparatus 10 is a low power mode (so-called sleep) that consumes less power than normal, then input/output with a device connected to an SMBus (registered trademark) are restricted in some cases. As illustrated in FIG. 11, when a host operation mode is a sleeping state (a state of S0i3 or less) that consumes less power than a normal operating state S0 specified by the ACPI (Advanced Configuration and Power Interface), or an L state that consumes less power than the L state specified by PCIe, then an SSD is set to non-operating and the response from the SSD (SSD response) will be inaccessible. However, when the operating state is S0, and the L state is L1.2 state, then there are only some models that respond (that are accessible). In FIG. 11, a D state refers to the power state of a connected device, and the L state refers to the power state of the link between the information processing apparatus 10 and a device. When an SSD response is not obtained, then the host cannot acquire an SSD temperature that accompanies the SSD response, thus making it impossible to accomplish control of the operation of the cooling fan on the basis of the SSD temperature.

The present invention has been made to solve the above-described problems, and an information processing apparatus according to the first aspect of the present invention is an information processing apparatus including: a processor; a controller; a solid-state storage device; and a heat dissipation fan, the processor and the controller being connected to the solid-state storage device by using a bus, and the solid-state storage device being installed at a position corresponding to the heat dissipation fan, wherein the processor acquires identification information of the solid-state storage device in association with location information indicating a position of the solid-state storage device, and the controller acquires in advance identification information and a logical address of the solid-state storage device, configures a reference table by associating location information corresponding to identification number acquired by the processor with a logical address corresponding to the identification information, and at the time of acquiring temperature data indicating a temperature of the solid-state storage device and a logical address of the solid-state storage device, refers to the reference table to identify location information corresponding to an acquired logical address, and then controls, on the basis of acquired temperature data, a heat dissipation fan corresponding to a position indicated by identified location information.

In the above-described information processing apparatus, when the processor starts its own operation, the processor may acquire the location information and the identification information, and notify the controller of the location information and the identification information, and the controller may start polling to the solid-state storage device.

In the above-described information processing apparatus, the solid-state storage device may include a temperature sensor that measures the temperature of the device itself, and respond to the controller with the temperature data indicating a measured temperature at the time of detecting a polling packet transmitted from the controller.

In the above-described information processing apparatus, the controller may store, in the reference table, the acquired temperature data in association with the location information, and may control an identified heat dissipation fan according to the temperature data stored in the reference table in the case where the temperature data cannot be acquired.

In the above-described information processing apparatus, the controller may stop or decelerate the operation of the heat dissipation fan on the basis of temperature data after a predetermined period of time elapses since temperature data was last acquired.

In the above-described information processing apparatus, the controller may stop or decelerate the control of the heat dissipation fan based on temperature data in the case where the number of non-response times, which is the number of times no response to polling to the solid-state storage device is received, exceeds a predetermined number of times.

A control method according to the second aspect of the present invention is a control method in an information processing apparatus including a processor, a controller, a solid-state storage device, and a heat dissipation fan, and having the processor and the controller connected with the solid-state storage device by using a bus, and the solid-state storage device installed at a position corresponding to the heat dissipation fan, the control method implementing a first step in which the processor acquires identification information of the solid-state storage device in association with location information indicating a position of the solid-state storage device; a second step in which the controller acquires in advance identification information and a logical address of the solid-state storage device, and configures a reference table by associating location information corresponding to identification number acquired by the processor with a logical address corresponding to the identification information; and a third step in which, at the time of acquiring temperature data indicating a temperature of the solid-state storage device and a logical address of the solid-state storage device, the controller refers to the reference table to identify location information corresponding to an acquired logical address, and controls a heat dissipation fan corresponding to a position indicated by identified location information on the basis of acquired temperature data.

According to the embodiments of the above-described aspects of the present invention, the temperature management of each solid-state storage device can be economically achieved.

BRIEF DESCRIPTION OF THE DRAWINGS

FIG. 5 is a diagram illustrating an example of the pin assignment of an SSD port according to the present embodiment.

FIG. 6 is a diagram illustrating a configuration example of a data group according to the present embodiment.

FIG. 11 is a diagram illustrating the relationship between the operating state of the main body of the information processing apparatus and the operating state of the SSDs.

DETAILED DESCRIPTION OF THE INVENTION

Figure 1:
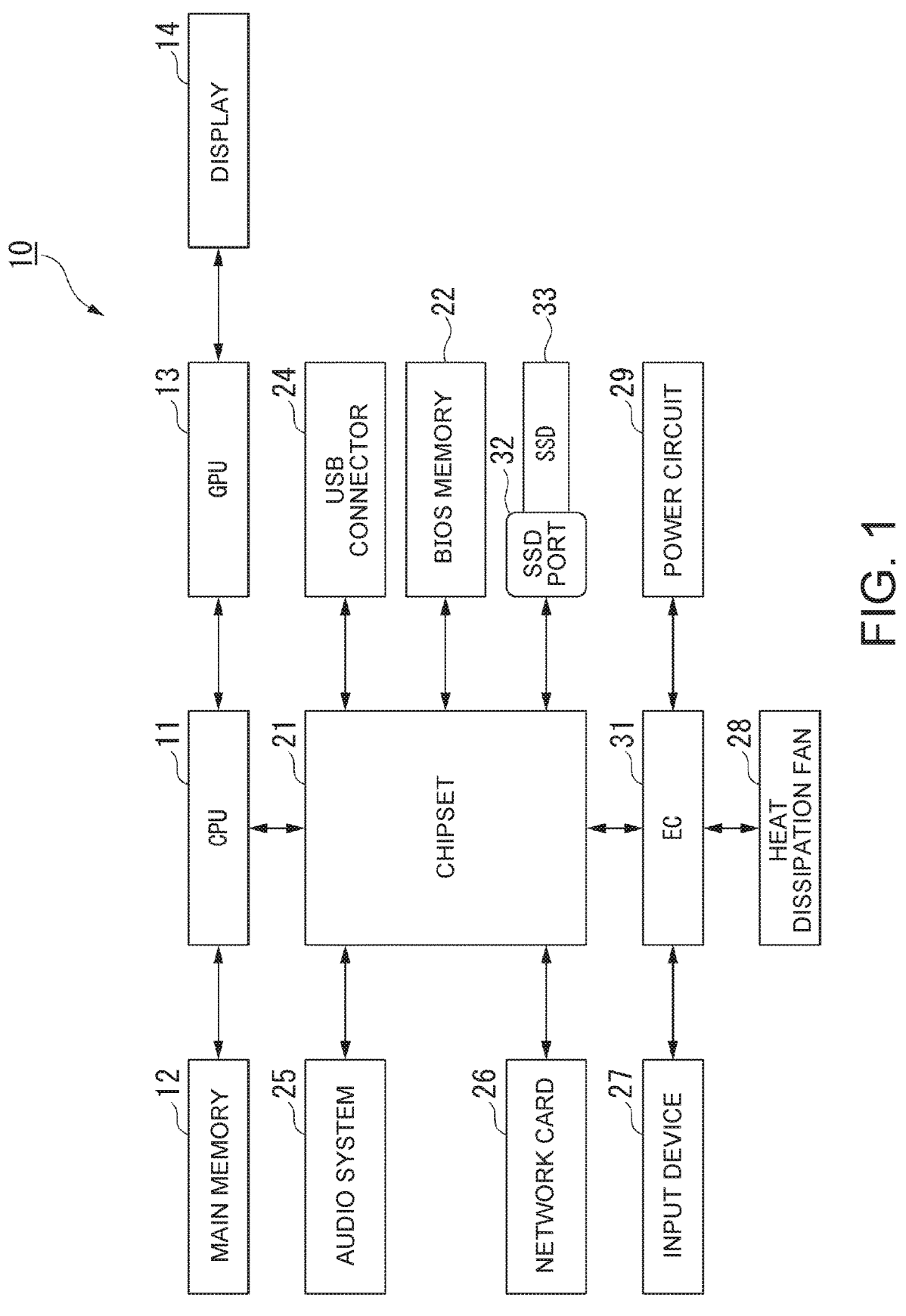
FIG. 1 is a schematic block diagram illustrating a hardware configuration of an information processing apparatus according to a present embodiment.

The following will describe an embodiment of the present invention with reference to the accompanying drawings. First, an information processing apparatus 10 according to an embodiment of the present invention will be outlined. FIG. 1 is a schematic block diagram illustrating a hardware configuration of the information processing apparatus 10 according to the present embodiment. The following description will focus mainly on the case where the information processing apparatus 10 is a laptop personal computer (PC), but the information processing apparatus 10 is not limited thereto. The information processing apparatus 10 may be implemented in any form such as a desktop PC, a tablet terminal device, a multi-function mobile phone (smartphone), or the like.

The information processing apparatus 10 includes a CPU (Central Processing Unit) 11, a main memory 12, a GPU (Graphic Processing Unit) 13, a display 14, a chipset 21, a BIOS (Basic Input Output System) memory 22, a USB (Universal Serial Bus) connector 24, an audio system 25, a network card 26, an input device 27, heat dissipation fans 28, a power circuit 29, an EC (Embedded Controller) 31, an SSD port 32, and SSDs 33.

The CPU 11 is a processor that executes programs stored in the main memory 12 to perform various types of arithmetic processing so as to perform and control the operation of each section of the information processing apparatus 10. In the present application, "executing a program" or "execution of a program" refers to performing processing indicated by instructions written in a program.

The main memory 12 functions as a work area for processing executed by the CPU 11. The main memory 12 temporarily or permanently stores programs executed by the CPU 11, data (including parameters) used for processing performed by the CPU 11, and data generated by processing by the CPU 11. The data stored in the main memory 12 may also include intermediate data that is generated by certain processing and that may be used by subsequent processing. The programs executed by the CPU 11 include, for example, an OS (Operating System), various drivers for operating hardware such as a peripheral device, various services/utilities, application programs, and the like. The main memory 12 includes one or a plurality of DRAMs (Dynamic Random Access Memories).

The GPU 13 carries out processing related to image display (drawing) under the control from the CPU 11. The GPU 13 is a processor that includes a video memory and has a function related to image display under the control from the CPU 11. The GPU 13 processes drawing commands output from the CPU 11 and writes obtained drawing information into the video memory. The GPU 13 reads newly written drawing information from the video memory and outputs the read drawing information to the display 14 as drawing data (display data).

The display 14 displays a display screen on the basis of the drawing data (display data) input from the GPU 13. The display 14 is, for example, a liquid crystal display.

The chipset 21 includes a bus controller for wired connection of various equipment (devices). The chipset 21 uses, for example, a PCIe (registered trademark) bus for connection. The chipset 21 is connectable to at least each of the CPU 11, the GPU 13 and the EC 31, and to the SSDs 33 via the SSD port 32 by using the PCIe (registered trademark). The chipset 21 may use, other than the PCIe (registered trademark), one type or a plurality of types of methods such as a USB, a serial ATA (AT Attachment), an SPI (Serial Peripheral Interface) bus, a PCI (Peripheral Component Interconnect) bus, and an LPC (Low Pin Count) bus to be connectable to other devices. The bus controller controls the input/output of data to/from devices connected according to individual methods.

In the example of FIG. 1, the chipset 21 is connected as a peripheral device to the BIOS memory 22, the USB connector 24, the audio system 25, the network card 26, the EC 31, and the SSD port 32. The CPU 11, the main memory 12, the GPU 13, and the chipset 21 function as host devices. The host devices are minimum required hardware in the computer system of the information processing apparatus 10.

The BIOS memory 22 is configured, including a nonvolatile memory that stores system firmware. An EEPROM (Electrically Erasable Programmable Read Only Memory), a flash ROM, or the like is used as the nonvolatile memory. The system firmware is a program that is involved in the operation of the entire computer system and is for providing an interface between hardware and various programs executed in the host devices. System firmware includes, for example, the BIOS (Basic Input/Output System). In the present application, such system firmware may be generically referred to as "BIOS."

The USB connector 24 is an interface for detachably connecting a peripheral device by using a USB. The USB connector 24 is fixedly installed to the chassis of the information processing apparatus 10.

The audio system 25 is a device capable of inputting/outputting, recording, and reproducing audio data.

The network card 26 connects to a network and enables wired or wireless data communication. The network card 26 may be made connectable to other devices directly using a wireless LAN (Local Area Network) or via another network.

The SSD port 32 is an interface that enables connection with the SSDs 33. The SSD port 32 may be configured as a root port connected to a PCIe (registered trademark) root complex. The SSD port 32 may be a terminal conforming to, for example, an M.2 standard. Although the number of the SSD port 32 is one in the example of FIG. 1, it may be two or more. The SSDs 33 can be connected to each of two or more SSD ports 32.

The SSDs 33 are auxiliary storage devices that store various data and programs. Programs stored in the SSDs 33 include an OS, drivers, services/utilities, application programs, and the like. The SSD 33 has a built-in or attached temperature sensor that measures the temperature of the SSD 33. The SSD 33 transmits temperature data indicating a measured temperature as an SSD temperature to the CPU 11 or the EC 31 via the SSD port 32.

The EC 31 is a microcomputer that monitors and controls the states of various devices (peripheral devices, sensors, and the like) regardless of the operating state (operation mode) of the information processing apparatus 10. The EC 31 is configured as a one-chip microcomputer (not shown) provided with, for example, a CPU, a ROM, a RAM, a multi-channel A/D (Analog to Digital) input terminal, a D/A (Digital to Analog) output terminal, a timer, and digital I/O terminals. For example, the input device 27, the heat dissipation fans 28, and the power circuit 29 are connected to the digital I/O terminals.

The EC 31 executes predetermined firmware (may be referred to as "ECFW" in the present application), which is separate from the system firmware, to exhibit the functions thereof. The EC 31 has a temperature management function and a power management function. The temperature management function includes a function of acquiring SSD temperature data indicating the temperature of the SSD 33 as an SSD temperature and a function of controlling the operation of the heat dissipation fan 28 on the basis of the SSD temperature data, as will be described later. The amount of heat dissipation from the SSD 33 is controlled by controlling the heat dissipation fan 28. The power management function is a function of controlling the power circuit 29 and supplying power consumed by each section of the information processing apparatus 10. The EC 31 controls power supplied to, for example, the CPU 11 and the GPU 13.

The input device 27 accepts user operations and outputs operation signals based on the accepted operations to the EC 31. Various information or commands are indicated by the operation signals. The input device 27 may be any one of, for example, a keyboard, a touchpad, a pointing device, or the like.

Figure 2:
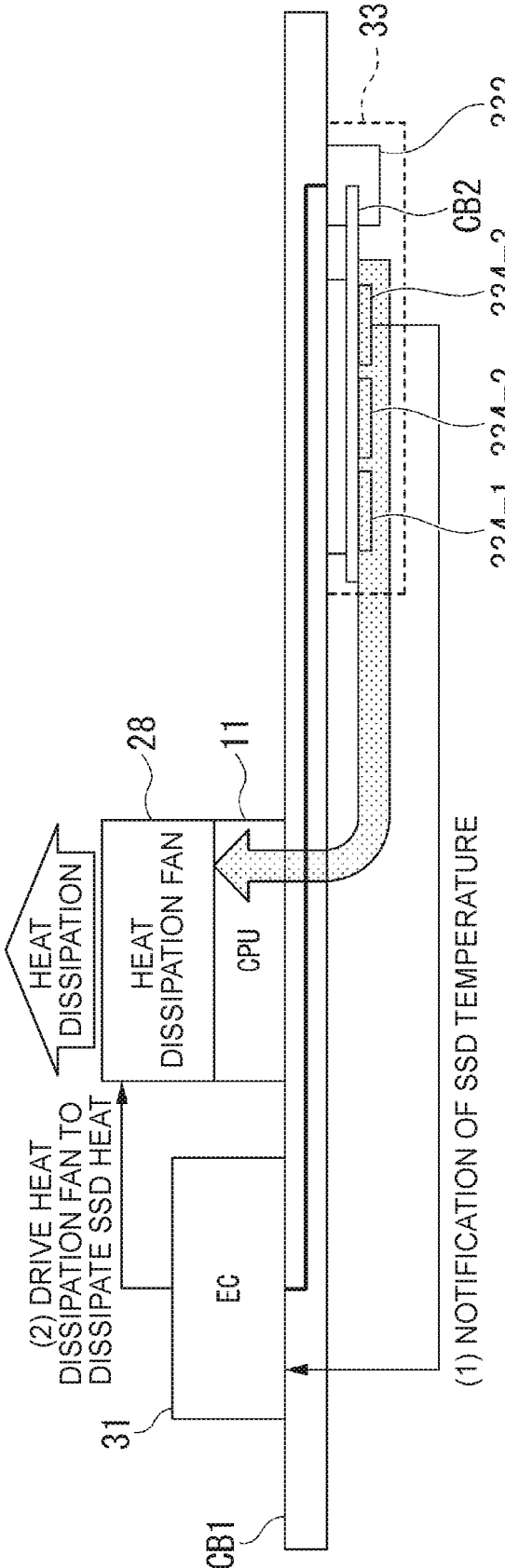
FIG. 2 is a side view illustrating a placement example of an SSD according to the present embodiment.

The heat dissipation fan 28 is configured, including a fan and an electric motor (motor). The EC 31 controls the amount of power supplied to the motor, and the motor rotates the fan at a speed based on the amount of supplied power. As illustrated in FIG. 2, the dissipation of heat from the SSD 33 is expedited by the airflow generated by the rotation of the fan. The position of the heat dissipation fan 28 may be any position associated with the position of the SSD 33, i.e., a position where the airflow generated by the rotation of the fan passes around the SSD 33. At this position, the heat radiation from the SSD 33 increases the temperature of the air drawn in around the SSD 33 from the outside of the information processing apparatus 10. The air, the temperature of which has risen, is exhausted to the outside of the information processing apparatus 10.

The power circuit 29 converts the voltage of DC power supplied from an AC/DC (Alternate Current/Direct Current) adaptor or a battery unit into an operating voltage for operating each section of the information processing apparatus 10. The power circuit 29 supplies the power, the voltage of which has been converted, to a part corresponding to the operating voltage in the information processing apparatus 10. The power circuit 29 includes, for example, a DC/DC converter, a charging/discharging unit, and the like in addition to the AC/DC adaptor and the battery unit. The power circuit 29 is an example of a power supply unit. The power circuit 29 operates under the control from an embedded controller 31.

In the present embodiment, the CPU 11 and the EC 31 are connected with the SSDs 33 by using the SSD port 32 and a bus, respectively. As the location information indicating the position of the SSD 33, predetermined identification information of the SSD port 32 may be used. When the SSD port 32 is configured as a root port connected to a PCIe (registered trademark) root complex, then the PCIe (registered trademark) root port number may be used as the identification information for the SSD port 32. As will be described later, the SSDs 33 connected to each SSD port 32 are installed at positions where an airflow generated by the heat dissipation fans 28 passes therearound. As will be described later, the location information of the SSDs 33 and the identification information of the heat dissipation fans 28 may be set beforehand in association with each other in the registers of the CPU 11 and the EC 31.

The CPU 11 and the EC 31 can acquire temperature data under predetermined pin assignment illustrated in FIG. 5. The example in FIG. 5 indicates that pin numbers 40, 42, and 44 assigned to the SMBus (registered trademark) among pin connectors based on a PCIe (registered trademark) standard are used to indicate that an alert signal (ALERT#), an SMB signal (SMB DATA), and a clock signal (SMB CLK) are transmitted. The individual signals are digital electrical signals that represent various types of information using two levels of voltage (0 V and 1.8 V in the example of FIG. 5). The I/O indicates inputs and outputs from devices to be connected. Various warnings are conveyed by alert data. Clock signals are used for synchronization with the CPU 11 or the EC 31. Temperature data is allocated to a partial area (Temp) of an SMB signal.

The data structure of temperature data may be independently defined, or a default data structure may be applied as temperature data. The temperature data may be transmitted, for example, by being included in, for example, SMART data. As illustrated in FIG. 6, the SMART data has a Start header at the beginning, a Stop delimiter at the end, and address (Addr R) and temperature (Temp) fields therebetween. The address and the SSD temperature of a transmission source SSD 33 are described in the address field and the temperature field, respectively.

A description will now be given of a placement example of the SSDs 33 according to the present embodiment. FIG. 2 is a side view illustrating a placement example of the SSDs 33 according to the present embodiment. In the example of FIG. 2, the CPU 11 and the EC 31 are placed on the front surface of a substrate CB 1, and the SSD 33 is placed on the back surface of the substrate CB 1. The heat dissipation fan 28 is placed on the front surface of the CPU 11. The EC 31, the CPU 11, and the SSD 33 are placed at a predetermined distance or more from each other. Under this placement, the CPU 11 and the EC 31 are connected using the SSD 33 and a bus, respectively. The EC 31 and the heat dissipation fan 28 are wired such that the EC 31 can control the operation of the heat dissipation fan 28.

The SSD 33 includes an SSD controller 332 and memory chips 334-1 to 334-3. The SSD controller 332 and the memory chips 334-1 to 334-3 are placed such that the surfaces thereof do not overlap each other on a substrate CB 2. The SSD controller 332 performs control related to writing or reading data to or from the memory chips 334-1 to 334-3. The SSD controller 332 includes, for example, an ASIC (Application Specific Integrated Circuit), which is an integrated circuit. The SSD controller 332 may have a temperature sensor built in or mounted on the surface thereof. The temperature sensor measures the temperature of own device.

The SSD controller 332 may have a SMART function to output a temperature detected by the temperature sensor as an SSD temperature to one of the EC 31 and the CPU 11 by including the detected temperature in SMART data. Each time a polling packet is received from either the EC 31 or the CPU 11 that becomes a transmission source, the SSD controller 332 transmits the SMART data including temperature data as the response data to the transmission source of the polling packet. The temperature sensor may be mounted mainly to detect temperature required for a self-protection function. The self-protection function includes, for example, slowing down of data read/write speed according to temperature rise for the purpose of alleviating or preventing dissipation of charges in the memory chips 334-1 to 334-3 due to a temperature rise. The received polling packet indicates that the EC 31 or the CPU 11, which becomes a transmission source device, is in operation.

Various data is stored in the memory chips 334-1 to 334-3. The memory chips 334-1 to 334-3 may be, for example, NAND flash memories. The number of memory chips is three in the example of FIG. 2, but may be one, two, or four or more. The temperature sensors may be provided in individual memory chips. The SSD controller 332 may determine, as the SSD temperature, a highest temperature among the temperatures notified from the temperature sensors of the individual memory chips, and output the determined SSD temperature to the EC 31 or the CPU 11.

As described above, the SSD controller 332 outputs (reports) the temperature data indicating the detected SSD temperature to the EC 31. The EC 31 controls the operation of the heat dissipation fan 28 on the basis of the SSD temperature indicated by the temperature data input from the SSD 33. The EC 31 drives the heat dissipation fan 28 to dissipate the heat of the SSD 33 when, for example, the SSD temperature exceeds a predetermined operating temperature threshold value. As the heat dissipation fan 28 rotates, an airflow is generated in a direction facing the rotating surface. In the example of FIG. 2, the generated airflow causes the drawn air to be sent around the SSD 33, the temperature of the sent-in air to rise due to heat radiation from the SSD 33, and the air to pass through the CPU 11 and the heat dissipation fan 28 before being exhausted. Therefore, heat generated in the SSD 33 is dissipated.

Figure 3:
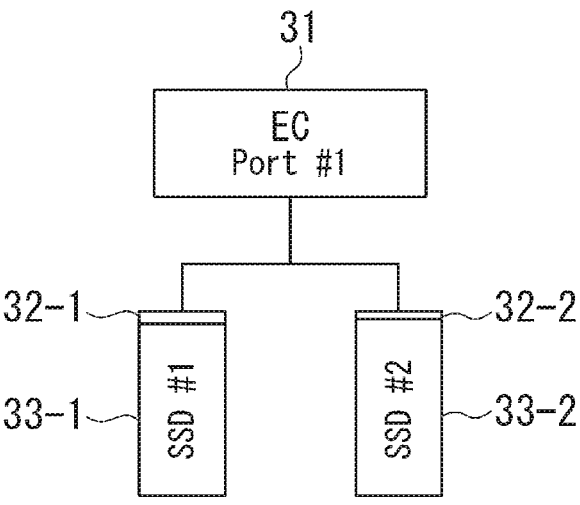
FIG. 3 is a diagram illustrating an example of connection between an EC and SSDs according to the present embodiment.

A plurality of SSDs 33 may be connected to the EC 31. In the example of FIG. 3, port #1 of the EC 31 is connected to two SSD ports 32-1 and 32-2 by using a bus. SSDs 33-1 and 33-2 are attached to the SSD ports 32-1 and 32-2, respectively. Based on the SSD temperatures transmitted from the SSDs 33-1 and 33-2, the EC 31 makes it possible to control the operations of the heat dissipation fans 28-1 and 28-2 corresponding thereto.

The heat dissipation fan 28 may also serve to dissipate heat from a processor, which is a heat source. The number of the heat dissipation fans 28 may be equal to or less than the number of processors. The positions of the individual heat dissipation fans 28 can be also associated with the positions of the processors, the heat of which is to be dissipated.

Figure 4:
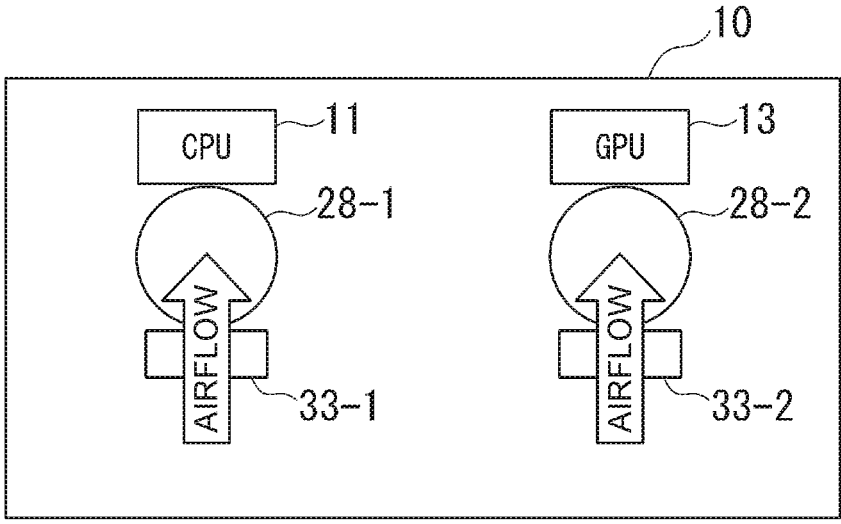
FIG. 4 is a diagram illustrating a placement example of heat dissipation fans and the SSDs according to the present embodiment.

In the example of FIG. 4, the CPU 11, the GPU 13, the heat dissipation fans 28-1 and 28-2, and the SSDs 33-1 and 33-2 are installed inside the chassis of the information processing apparatus 10. The heat dissipation fan 28-1 is associated with the CPU 11 and the SSD 33-1. The airflow generated by the operation of the heat dissipation fan 28-1 passes around the SSD 33-1 and the CPU 11 to expedite heat dissipation. Similarly, the heat dissipation fan 28-2 is associated with the GPU 13 and the SSD 33-2. The airflow generated by the operation of the heat dissipation fan 28-2 expedites heat dissipation from the SSD 33-2 and the GPU 13.

The information processing apparatus 10 may further include temperature sensors. Each temperature sensor may be installed at a position within a predetermined range from other members to be thermally protected. Each temperature sensor may output data indicating a measured temperature (hereinafter referred to as "other member temperature") to the CPU 11 as the data of other member temperature. The CPU 11 may control the operation of the heat dissipation fan 28 corresponding to the temperature sensor that has measured other member temperature on the basis of the data of other member temperature. In the example of FIG. 4, the other member may be the CPU 11 or the GPU 13. When the other members are the CPU 11 and the GPU 13, then the objects to be controlled are the heat dissipation fans 28-1 and 28-2, respectively.

Thus, when the temperatures of other members are high even when the temperatures of the SSDs 33 are sufficiently low, then the heat dissipation is expedited. The control of the operations of the heat dissipation fans 28 based on the data of other member temperatures may be performed by the EC 31 in place of the CPU 11. In such a case, the output destination of the data of other member temperatures from the temperature sensors will be the EC 31.

Figure 7:
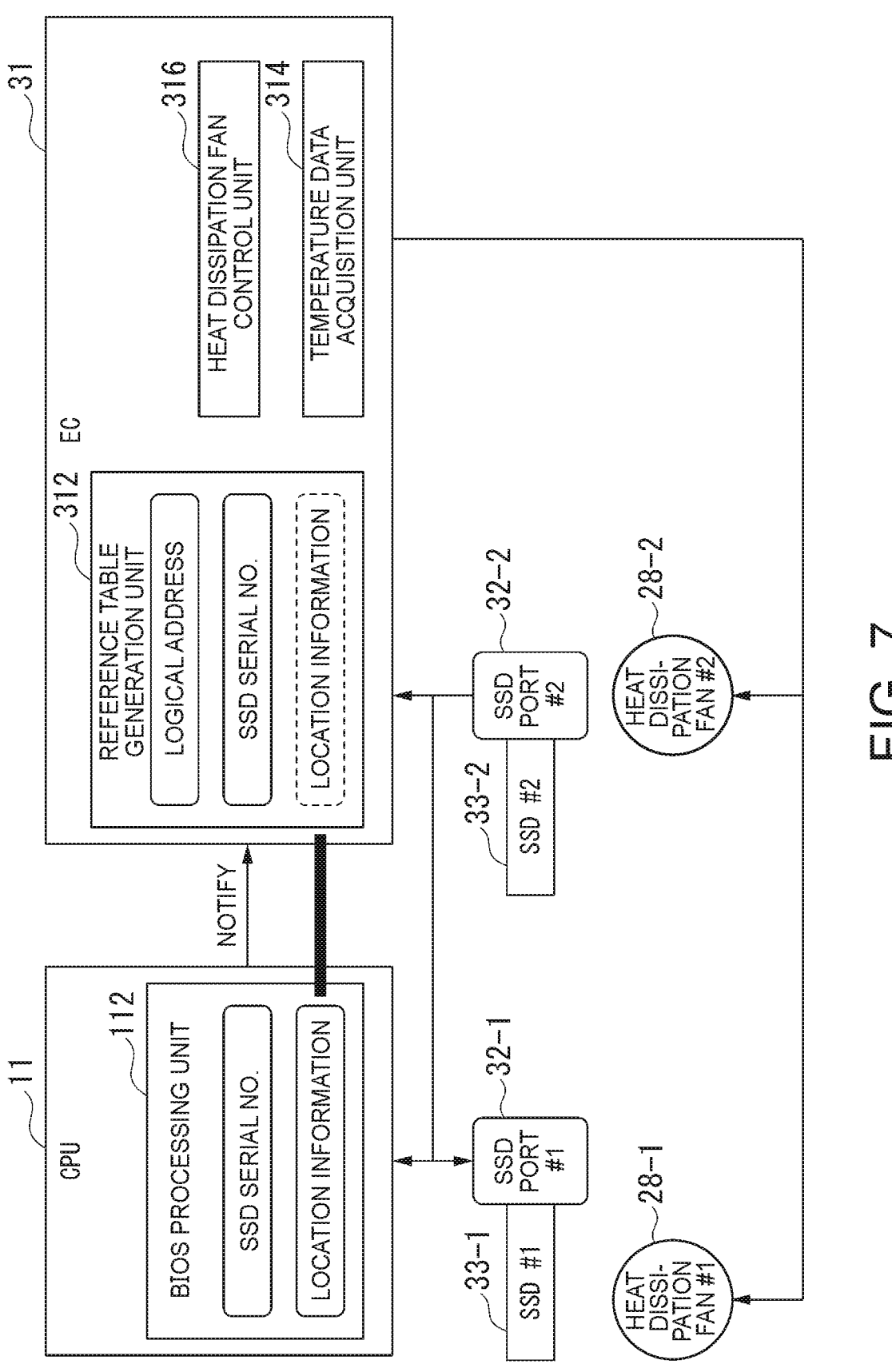
FIG. 7 is a schematic block diagram illustrating an example of the functional configuration of the information processing apparatus according to the present embodiment.

A description will now be given of an example of the functional configuration of the information processing apparatus 10 according to the present embodiment. FIG. 7 is a schematic block diagram illustrating an example of the functional configuration of the information processing apparatus 10 according to the present embodiment. The information processing apparatus 10 includes a BIOS processing unit 112, a reference table generation unit 312, a temperature data acquisition unit 314, and a heat dissipation fan control unit 316.

The function of the BIOS processing unit 112 is started at a startup, i.e., when the application of power to a host device including the CPU 11 is started (at the time of power on). When the CPU 11 detects, for example, the start of power supply from the power circuit 29 to itself, the CPU 11 reads BIOS from the BIOS memory 22 and develops the read BIOS in the main memory 12. The functions of the BIOS processing unit 112 are implemented by collaboration between the BIOS, which has been developed in the main memory 12, and the CPU 11. The CPU 11 executes the BIOS and starts POST (power on self-test) processing as a function of the BIOS processing unit 112. The CPU 11 initiates an OS startup (OS boot) after completing the POST processing. The POST processing includes processes such as verifying the normality of a BIOS code, detecting devices connected to the device itself, and initializing the detected devices. Devices to be detected include the SSDs 33.

In the POST processing, the BIOS processing unit 112 identifies, for example, a PCIe (registered trademark) root port number, which is the identification information indicating each SSD port 32 connected to the CPU 11.

The BIOS processing unit 112 recognizes each device connected to itself. For example, the BIOS processing unit 112 sends out a connection request to a bus connected to itself. The SSD controller 332 of the SSD 33 in operation and connected to the bus transmits a response signal including its own SSD serial number to the CPU 11 as a response to the connection request received using the bus. The SSD serial number is an example of identification information unique to each SSD 33. The SSD serial number of the SSD 33 provided with the SSD controller 332 may be set in advance in the SSD controller 332. The BIOS processing unit 112 extracts from the received response signal the SSD serial number of the SSD 33 that is the transmission source of the response signal to the connection request received using the bus. Further, the BIOS processing unit 112 identifies the PCIe (registered trademark) root port number of the SSD port 32 that has received the response signal as the location information of the SSD 33.

For each SSD 33 that becomes the transmission source of a response signal, the BIOS processing unit 112 associates identified location information with the extracted identification information and notifies the EC 31 of the associated information.

The functions of the reference table generation unit 312, the temperature data acquisition unit 314, and the heat dissipation fan control unit 316 are implemented by the collaboration between the ECFW and the CPU of the EC 31. The CPU of the EC 31 executes the ECFW independently of the operating state of the CPU 11 to provide the functions of the reference table generation unit 312, the heat dissipation fan control unit 316, and the temperature data acquisition unit 314.

For each location information(e.g., PCIe (registered trademark) root port number) of an SSD 33, data including the identification information of a heat dissipation fan 28 installed at a position corresponding to the SSD 33 is stored beforehand in association with each location information as a reference table in the reference table generation unit 312. The reference table may be stored in a register provided in the EC 31 (may be hereinafter referred to as "EC register").

The reference table generation unit 312 monitors devices connected to the bus, and at predetermined time intervals, determines whether there is a newly discovered device. In address setting, for example, the reference table generation unit 312 determines the logical address of a newly discovered device and sends an address notification indicating the determined logical address to the bus. The reference table generation unit 312 receives a signal of response to the address notification from the SSD 33 as a new device connected to the bus. The reference table generation unit 312 can identify the identification information (e.g., an SSD serial number) of the device extracted from the response signal as the identification information of the SSD 33. The reference table generation unit 312 can identify, as the location information of the SSD 33, the identification information of the SSD port 32 that has received the response signal. Therefore, after an SSD 33 connected to the bus is activated, it is possible to newly discover the SSD 33. An example of the address setting will be described later. The reference table generation unit 312 refers to the reference table to search for the location information that matches the identified location information, and writes (adds) the logical address to the reference table in association with the location information.

After the POST processing by the CPU 11 is started, the reference table generation unit 312 waits for location information and identification information transmitted from the CPU 11. The reference table generation unit 312 receives, from the CPU 11, the location information and the identification information that are associated with each other.

For each received location information, the reference table generation unit 312 refers to the reference table to search for location information matching a received location information, and writes (adds), to the reference table, the identification information corresponding to the location information in association with the location information.

Thus, the reference table indicates the correspondence relationship with the heat dissipation fan 28 for each SSD 33 and is configured to associate the location information and the logical address corresponding to the identification information for each SSD 33.

The temperature data acquisition unit 314 receives temperature data from each SSD 33. The temperature data acquisition unit 314 performs, for example, polling to the SSDs 33. In the polling, the temperature data acquisition unit 314 sends out a polling packet at predetermined time intervals. The temperature data acquisition unit 314 receives temperature data from the SSD 33 as a response to the polling packet, and identifies the logical address of the SSD 33 that is the transmission source of the received temperature data. The temperature data acquisition unit 314 refers to the reference table to identify the SSD serial number corresponding to the identified logical address. The temperature data acquisition unit 314 stores, in the EC register, the identified SSD serial number and the temperature data that are associated with each other.

The heat dissipation fan control unit 316 identifies the heat dissipation fan 28 corresponding to the SSD 33 indicated by the SSD serial number identified by the temperature data acquisition unit 314. The heat dissipation fan control unit 316 can identify, for example, the SSD serial number corresponding to the temperature data newly stored in the EC register, refer to the correspondence table, and identify the heat dissipation fan 28 indicated by the identification information corresponding to the identified SSD serial number. The heat dissipation fan control unit 316 controls the operation of the heat dissipation fan 28 identified on the basis of the SSD temperature indicated by the temperature data corresponding to the SSD serial number.

The heat dissipation fan control unit 316 can control the operating state of a heat dissipation fan by using, for example, a temperature control table stored in the EC register in advance. An operating temperature threshold value and a stop temperature threshold value, for example, are set in the temperature control table in advance. As the operating temperature threshold value, the upper limit of temperature at which the SSDs 33 are allowed to operate may be set. As the stop temperature threshold value, a temperature equal to or lower than the operating temperature threshold value may be set. When the SSD temperature of the SSD 33 related to an identified SSD serial number becomes higher than the operating temperature threshold value, the heat dissipation fan control unit 316 operates the heat dissipation fan 28 corresponding to the SSD 33 at a predetermined operation amount. The operation amount may be defined using any one of the rotational speed, the noise level, and the power consumption of the heat dissipation fan 28. When the SSD temperature becomes lower than the stop temperature threshold value, the heat dissipation fan control unit 316 stops the operation of the heat dissipation fan 28 corresponding to the SSD 33 having the SSD temperature thereof detected.

To operate a heat dissipation fan 28, the heat dissipation fan control unit 316 outputs, for example, a control signal indicating an operation command to the heat dissipation fan 28. When the control signal indicating the operation command is received from the EC 31, the heat dissipation fan 28 receives power of a predetermined amount of power supplied from the power circuit 29 to rotate the motor. To stop the operation of a heat dissipation fan 28, the heat dissipation fan control unit 316 outputs, for example, a control signal indicating a stop command to the heat dissipation fan 28. When the heat dissipation fan 28 receives the control signal indicating the stop command from the EC 31, the supply of power from the power circuit 29 is stopped so as to stop the rotation of the motor.

In the temperature control table, an operating temperature threshold value and a stop temperature threshold value may be set for each of operation modes of predetermined different operation amounts in a plurality of steps. The greater or lesser amount of operation corresponds to a higher or lower rotational speed of the heat dissipation fan 28. The setting may be made such that the operating temperature threshold value and the stop temperature threshold value are higher for an operation mode with a larger operation amount, and the stop temperature threshold value is lower than the operating temperature threshold value for each operation mode.

When referring to the temperature control table, when the heat dissipation fan control unit 316 finds that the SSD temperature of the SSD 33 indicated by an identified SSD serial number is higher than the operating temperature threshold value related to an operation mode set at that point, then the heat dissipation fan control unit 316 determines the operation amount corresponding to the operation mode. The heat dissipation fan control unit 316 causes the heat dissipation fan 28 corresponding to the SSD 33 indicated by the identified SSD serial number to operate at a determined operation amount. Thereafter, the heat dissipation fan control unit 316 changes the operation mode to an operation mode having an operation amount that is larger by one step. When there is no operation mode having a larger operation amount, then the heat dissipation fan control unit 316 does not change the operation mode. The initial values of the operation modes are set in advance in the heat dissipation fan control unit 316. Consequently, when the SSD temperature rises, the operation amount of a heat dissipation fan 28 increases in steps. When the SSD temperature becomes lower than the stop temperature threshold value for the operation mode while the heat dissipation fan 28 is operating, the heat dissipation fan control unit 316 changes the operation mode to an operation mode having an operation amount that is one step smaller, and causes the heat dissipation fan 28 to operate at the operation amount for the operation mode. Thus, when the SSD temperature drops, the operation amount of a heat dissipation fan 28 decreases in steps. When there is no operation mode having an operation amount that is less by one step, then the heat dissipation fan control unit 316 stops the operation of the heat dissipation fan 28.

To operate a heat dissipation fan 28 in a certain operation mode, the heat dissipation fan control unit 316 outputs, for example, a control signal indicating the operation mode to the heat dissipation fan 28. When the control signal indicating the operation mode is received from the EC 31, the heat dissipation fan 28 receives the supply of power at a predetermined power amount corresponding to the instructed operation mode from the power circuit 29 to rotate the motor. An operation mode of a larger operation amount involves a larger corresponding amount of power.

In the case where the information processing apparatus 10 is further provided with a temperature sensor, based on the other member temperature indicated in the sensor temperature data input from the temperature sensor, the BIOS processing unit 112 may control the operation of the heat dissipation fan 28 corresponding to the temperature sensor after the POST processing is completed. The operation control method for the heat dissipation fan 28 on the basis of the other member temperature may be the same as the operation control method based on the SSD temperature. A temperature control table indicating the correspondence relationship between the operating temperature threshold value and the stop temperature threshold value, and the other member temperature for each operation mode is set in the BIOS processing unit 112 in advance.

When the SSD temperature becomes lower than the stop temperature threshold value with respect to the SSD temperature in the operation mode at the point, the heat dissipation fan control unit 316 may output an operation control instruction indicating the operation control based on the other member temperature to the BIOS processing unit 112 to stop the operation control of a heat dissipation fan 28 based on the SSD temperature. The heat dissipation fan control unit 316 may change the operation mode of the heat dissipation fan 28 to an operation mode having an operation amount that is smaller by one step, and then output an operation control instruction to the BIOS processing unit 112.

The BIOS processing unit 112 starts the operation control of the heat dissipation fan 28 based on the other member temperature when an operation control instruction is received from the heat dissipation fan control unit 316. Then, when the other member temperature becomes lower than the stop temperature threshold value with respect to the other member temperature in the operation mode at the point, the BIOS processing unit 112 outputs an operation control instruction based on the SSD temperature to the heat dissipation fan control unit 316 to stop the operation control of the heat dissipation fan 28 based on the other member temperature. The BIOS processing unit 112 may change the operation mode of the heat dissipation fan 28 to an operation mode having an operation amount that is smaller by one step, and then output an operation control instruction to the heat dissipation fan control unit 316.

The heat dissipation fan control unit 316 restarts the operation control of the heat dissipation fan 28 based on the SSD temperature when an operation control instruction is received from the BIOS processing unit 112. The SSD temperature drops due to a decrease in the power consumption of the CPU 11, so that the access to the SSD 33 from the CPU 11 tends to become inactive. Consequently, the SSD temperature at this stage may become lower than the SSD temperature at the start of the operation control of the heat dissipation fan 28 based on the other member temperature.

Thus, in the operation control of the heat dissipation fan 28, when the SSD temperature drops, the other member temperature is preferentially referred to, and when the other member temperature drops, the SSD temperature is preferentially referred to. For example, in the case where the temperature of the CPU 11 as other member is high even though the SSD temperature has sufficiently dropped, the operation amount of the heat dissipation fan 28 may be maintained or the operation thereof may be continued. This protects the entire system. Further, the conflict between the operation control based on the SSD temperature and the operation control based on the other member temperature is avoided.

The operation control based on the other member temperature may be performed by the heat dissipation fan control unit 316 in place of the BIOS processing unit 112. In such a case, the output of the operation control instruction based on the other member temperature by the heat dissipation fan control unit 316 and the output of the operation control instruction based on the SSD temperature by the BIOS processing unit 112 are omitted.

Figure 8:
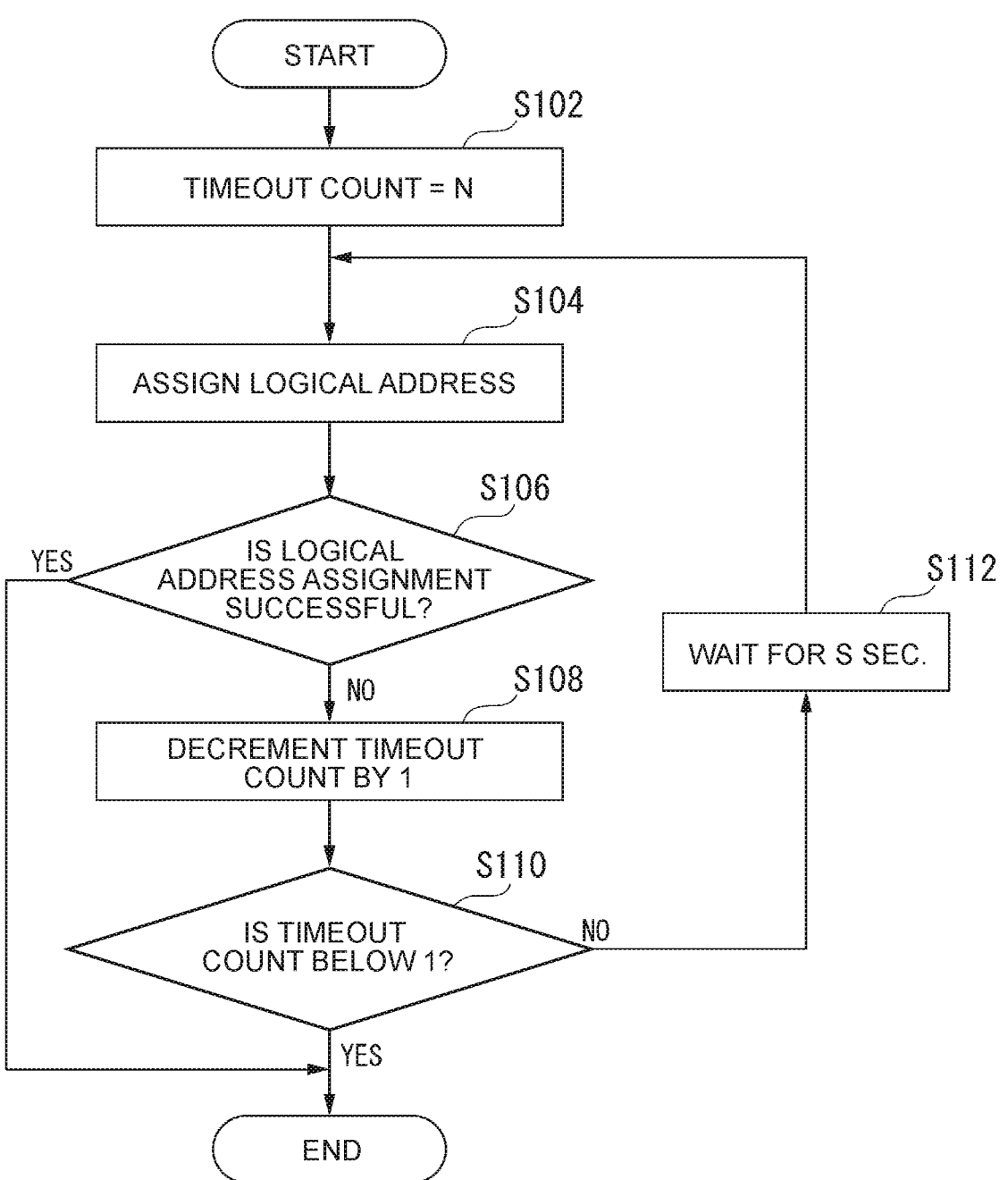
FIG. 8 is a flowchart illustrating an example of address setting according to the present embodiment.

A description will now be given of an example of address setting according to the present embodiment. FIG. 8 is a flowchart illustrating an example of the address setting according to the present embodiment. The processing illustrated below is a technique based on ARP, and is performed for the reference table generation unit 312 of the EC 31 to newly discover a peripheral device (e.g., an SSD 33) connected using a bus.

(Step S102) The reference table generation unit 312 sets an initial value N (N being a predetermined integer equal to or greater than 1) of a timeout count. The N corresponds to the number of attempts of address assignment.

(Step S104) The reference table generation unit 312 determines one logical address (e.g., a port number) having a predetermined format, and sends an address notification indicating the determined logical address and a default own device (i.e., the EC 31) address to the bus (address assignment). When a device (e.g., an SSD 33) connected to the bus receives the address notification received from the reference table generation unit 312, the device (i.e., the device connected to the bus) returns response information including its own identification information.

(Step S106) The reference table generation unit 312 waits for a signal of response to the address notification, and determines whether the address assignment is successful according to whether the response signal is received within a predetermined time from the sending of the address notification. When the address assignment is successful (YES in Step S106), then the reference table generation unit 312 transmits an acknowledgement to a device that is the transmission source of the response signal, and terminates the processing in FIG. 8. The device that has received the acknowledgement sets the logical address indicated by the address notification as its own address, and rejects acknowledgments received thereafter. The set logical address is used to identify the transmission/reception destination of data transmitted using the bus.

When the address assignment is not successful (NO in step S106), then the process proceeds to the processing of step S108.

(Step S108) The reference table generation unit 312 subtracts one from the timeout count at that point.

(Step S110) The reference table generation unit 312 determines whether the timeout count at that point is below 1. When the timeout count is below 1 (YES in Step S110), then the reference table generation unit 312 determines that the address assignment has failed, and terminates the processing in FIG. 1. When the timeout count is 1 or more (NO in Step S110), then the reference table generation unit 312 waits for S seconds (S being an integer equal to or greater than 0), and returns to the processing of step S104. When repeating Step S104, the reference table generation unit 312 newly issues a logical address different from the already determined logical address.

When assigning logical addresses to a plurality of devices, the reference table generation unit 312 may repeat the processing of FIG. 8 until the response signals are no longer received from new transmission sources.

In Step S106, when the reference table generation unit 312 receives response signals from a plurality of devices within a predetermined time from the sending of an address notification, then the reference table generation unit 312 identifies the device that is the transmission source of the response signal first received, and rejects the response signals received from other devices. The reference table generation unit 312 determines an assigned logical address as the logical address for the identified device, and transmits an acknowledgement to the device. The reference table generation unit 312 repeatedly attempts address assignment for other devices.

The logical addresses assigned to the individual SSDs 33 by the processing of FIG. 8 may be different depending on the startup timing of the CPU 11 or the SSDs 33. In the present embodiment, the reference table is used to make it possible to identify an SSD 33, on which the SSD temperature has been detected, and further to identify a heat dissipation fan 28 to be controlled, regardless of the difference in logical address at startup timing.

Figure 9:
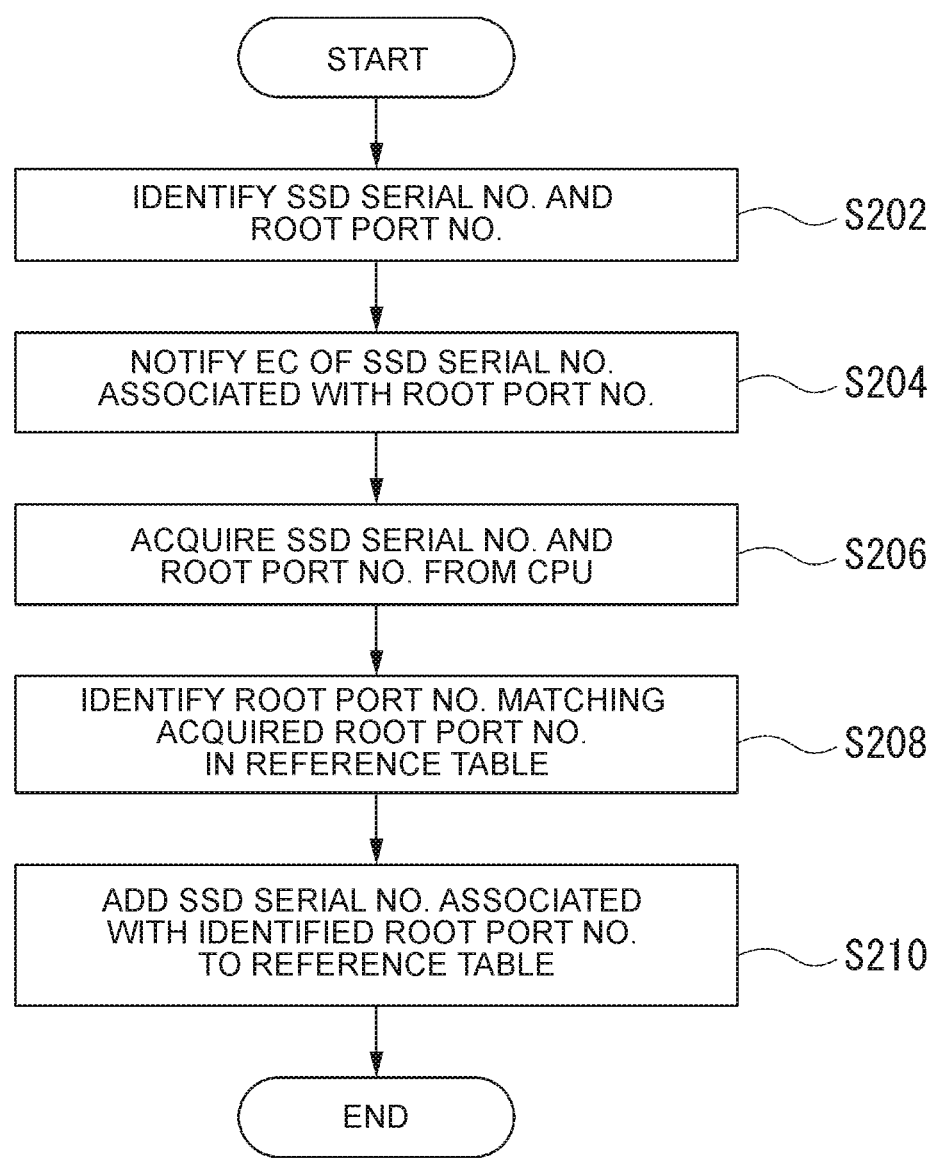
FIG. 9 is a flowchart illustrating an example of reference table generation processing according to the present embodiment.

A description will now be given of an example of the reference table generation processing according to the present embodiment. FIG. 9 is a flowchart illustrating the example of the reference table generation processing according to the present embodiment. A reference table is set in advance in the EC 31, the reference table including the root port number of the SSD port 32, to which the SSD 33 is connected, as the location information of the SSD 33 and the identification information of the heat dissipation fan 28, and having the root port number and the identification information associated with each other. Further, the reference table describes logical addresses further associated for each discovered SSD 33.

(Step S202) The BIOS processing unit 112 of the CPU 11 identifies the SSD serial number as the identification information of an SSD 33 connected thereto and the root port number of the SSD 33, to which the SSD 33 is connected, as the location information of the SSD 33.

(Step S204) The BIOS processing unit 112 associates the identified SSD serial number with the identified root port number for each SSD 33, and notifies the EC 31 of the associated information.

(Step S206) The reference table generation unit 312 of the EC 31 acquires the SSD serial number and the root port number for each SSD 33 from the CPU 11.

(Step S208) The reference table generation unit 312 identifies a root port number that matches the acquired root port number in the reference table.

(Step S210) The reference table generation unit 312 adds, to the reference table, the SSD serial number in association with the identified root port number. Thus, for each location information of the discovered SSD 33, the reference table, in which the identification information of the heat dissipation fan 28, the identification information of the SSD 33, and the logical address are associated, is generated.

Figure 10:
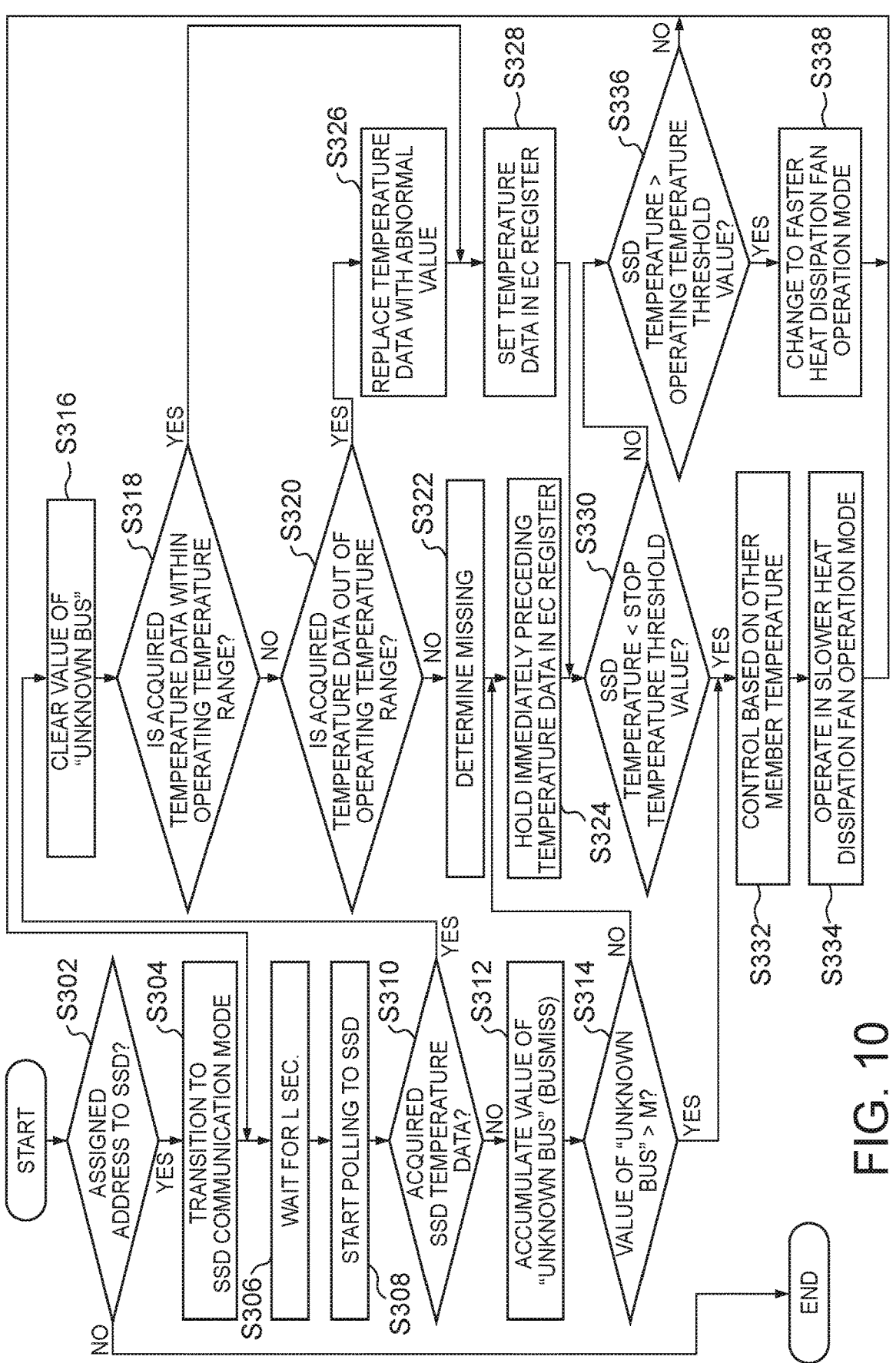
FIG. 10 is a flowchart illustrating an example of SSD temperature control according to the present embodiment.

A description will now be given of an example of the SSD temperature control according to the present embodiment. FIG. 10 is a flowchart illustrating an example of the SSD temperature control according to the present embodiment.

(Step S302) The temperature data acquisition unit 314 of the EC 31 refers to the reference table stored in the EC register to determine whether a logical address has been assigned for each connected SSD 33. For the SSD 33 to which a logical address has been assigned (YES in Step S302), the process proceeds to the processing of Step 5304 to perform the processing of the subsequent steps. For the SSD 33 to which no logical address has been assigned (NO in Step S302), the process ends without performing the processing in FIG. 10.

(Step S304) The temperature data acquisition unit 314 transitions to the SSD communication mode and becomes communicable with the SSDs 33.

(Step S306) The temperature data acquisition unit 314 waits for L (L being an integer equal to or more than 0) seconds.

(Step S308) The temperature data acquisition unit 314 starts polling to the SSD 33. In polling, the temperature data acquisition unit 314 sends out a polling packet to the bus at fixed time intervals.

(Step S310) The temperature data acquisition unit 314 waits for temperature data from the SSD 33 connected to the bus and determines whether the temperature data is acquired within a predetermined time from the sending of the polling packet. When the temperature data is acquired (YES in Step S310), then the process proceeds to the processing of Step S316. When the temperature data has not been acquired (NO in Step S310), then the process proceeds to the processing of Step S312.

(Step S312) The temperature data acquisition unit 314 increments the value of "unknown bus" (BUSMISS) by 1 and performs accumulation. The value of "unknown bus" corresponds to the number of times temperature data is not received as a polling packet response from the SSD 33 (the number of times of non-response).

(Step S314) The temperature data acquisition unit 314 determines whether the value of the "unknown bus" is greater than M. M is a predetermined integer equal to or greater than 1. M corresponds to the threshold value of the number of times of non-response. When the value of the "unknown bus" is greater than M (YES in Step S314), then the process proceeds to the processing of Step S332. In this case, the SSD 33 does not operate, so that it is inferred that the SSD temperature is sufficiently low. When the value of the "unknown bus" is M or less (NO in Step S314), then the process proceeds to the processing of Step S324.

(Step S316) The temperature data acquisition unit 314 clears the value of the "unknown bus" to 0 (zero).

(Step S318) The temperature data acquisition unit 314 determines whether the SSD temperature indicated by the acquired temperature data is within a predetermined operating temperature range. When the SSD temperature is within the operating temperature range (YES in Step S318), then the process proceeds to the processing of Step S328. When the SSD temperature is not within the operating temperature range (NO in Step S318), then the process proceeds to the processing of Step S320.

(Step S320) The temperature data acquisition unit 314 determines whether the SSD temperature indicated by the acquired temperature data is out of the predetermined operating temperature range. When the SSD temperature is out of the operating temperature range (YES in Step S320), then the process proceeds to the processing of Step S326. When the SSD temperature is not out of the operating temperature range (NO in Step S320), then the process proceeds to the processing of Step S322.

(Step S322) The temperature data acquisition unit 314 determines that the SSD temperature cannot be acquired, i.e., the SSD temperature is missing.

(Step S324) The temperature data acquisition unit 314 holds immediately preceding temperature data stored in the EC register.

(Step S326) The temperature data acquisition unit 314 replaces temperature data with an abnormal value indicating that the SSD temperature indicated in the acquired temperature data is abnormal.

(Step S328) The temperature data acquisition unit 314 extracts, from the temperature data, the logical address of the SSD 33 from which the temperature data has been acquired, refers to the reference table to associate the extracted logical address with a matching logical address, and sets the temperature data indicating the SSD temperature in the EC register.

(Step S330) The heat dissipation fan control unit 316 determines whether the SSD temperature indicated in the temperature data corresponding to the identified logical address set in the EC register is lower than the stop temperature threshold value for the SSD temperature in the operation mode at that point. When the SSD temperature is determined to be low (YES in Step S330), then the process proceeds to the processing of Step S332. When the SSD temperature is determined to be not low (NO in Step S330), then the process proceeds to the processing of Step S336.

(Step S332) The heat dissipation fan control unit 316 outputs an operation control instruction to the CPU 11 to stop its own operation control of the heat dissipation fan 28.

The BIOS processing unit 112 of the CPU 11 starts the operation control of the heat dissipation fan 28 on the basis of the other member temperature when the operation control instruction is received from the EC 31.

Consequently, even if the SSD temperature falls lower than the stop temperature threshold value of the operation mode at the beginning of the present step thereafter, the operation mode of the heat dissipation fan 28 is maintained without being changed to an operation mode of a smaller operation amount when the other member temperature is higher than the stop temperature threshold value.

When the other member temperature becomes lower than the stop temperature threshold value for the other member temperature in the operation mode at that point, the BIOS processing unit 112 outputs the operation control instruction to the heat dissipation fan control unit 316 to stop its own operation control based on the other member temperature.

(Step S334) When the operation control instruction is received from the CPU 11, the heat dissipation fan control unit 316 restarts the operation control of the heat dissipation fan 28 on the basis of the SSD temperature. The SSD temperature at this point is lower than the temperature at the point when its own operation control of the heat dissipation fan 28 was stopped, so that the heat dissipation fan 28 is operated in the operation mode of a smaller operation amount (lower speed). When there is no operation mode of a smaller operation amount, then the heat dissipation fan control unit 316 stops the operation of the operating heat dissipation fan 28. Thereafter, the process proceeds to the processing of Step S306.

(Step S336) The temperature data acquisition unit 314 determines whether the SSD temperature indicated in the temperature data corresponding to the identified logical address set in the EC register is higher than the operating temperature threshold value for the SSD temperature in the operation mode at that point. When the SSD temperature is determined to be high (YES in Step S336), then the process proceeds to Step S338. When the SSD temperature is determined to be not high (NO in Step S336), then the process proceeds to the processing of Step S306.

(Step S338) The heat dissipation fan control unit 316 refers to the reference table to identify the heat dissipation fan 28 corresponding to the identified logical address, and changes the operation mode of the identified heat dissipation fan to an operation mode of an operation amount that is greater than that of the operation mode at that point. When there is no operation mode of a greater operation amount, then the temperature data acquisition unit 314 does not change the operation mode. Thereafter, the process proceeds to the processing of Step S306.

As described above, the information processing apparatus 10 according to the present embodiment includes a processor (e.g., the CPU 11), a controller (e.g., the EC 31), solid-state storage devices (e.g., the SSDs 33), and the heat dissipation fans 28. The processor and the controller are connected with the solid-state storage device by using a bus, and the solid-state storage devices are installed in association with the heat dissipation fans. The processor acquires the identification information (e.g., an SSD serial number) of a solid-state storage device in association with the location information (e.g., a root port number) indicating the position of the solid-state storage device. The controller acquires in advance the identification information and the logical address of the solid-state storage device, and configures a reference table by associating the location information corresponding to the identification information acquired by the processor with the identification information. When acquiring the temperature data indicating the temperature of a solid-state storage device and the logical address of the solid-state storage device, the controller refers to the reference table to identify the location information corresponding to the acquired logical address, and controls the heat dissipation fan corresponding to the position indicated by the identified location information on the basis of the acquired temperature data.

According to the configuration, the reference table is referred to, and the location information corresponding to the logical address of the solid-state storage device from which the temperature data has been acquired is identified. The heat dissipation fan corresponding to the position indicated by the identified location information is controlled on the basis of the acquired temperature data. Thus, the controller makes it possible to achieve the temperature control of each solid-state storage device regardless of the operating state of a processor constituting the main body of the information processing apparatus 10.

Further, when starting its own operation, the processor acquires the location information and the identification information of a solid-state storage device, and notifies the controller of the acquired location information and identification information. The controller may start polling to the solid-state storage device.

According to the configuration, in the process of discovering a solid-state storage device connected to the processor at a startup, the processor can assign a logical address to acquire the identification information of the solid-state storage device. The controller can acquire temperature data as a response to the polling to the solid-state storage device. Without additional components, the temperature control of solid-state storage devices that does not depend on the operating state of a processor can be economically achieved by enabling the assignment of logical addresses, the acquisition of identification information, and the acquisition of temperature data.

Further, the solid-state storage device may be provided with a temperature sensor that measures the temperature thereof, and may respond to the controller with temperature data indicating a measured temperature when detecting a polling packet transmitted from the controller.

The configuration eliminates the need for providing a separate temperature sensor, and makes it possible to use a temperature measured by the temperature sensor provided in the solid-state storage device to control the heat dissipation fan 28. Without requiring an additional temperature sensor, a measured temperature can be acquired without delay. Thus, real-time control based on the temperature of the solid-state storage device can be achieved.

Further, the controller may store, in the reference table, acquired temperature data in association with location information, and may control an identified heat dissipation fan on the basis of temperature data stored in the reference table when temperature data cannot be acquired.

According to the above-described configuration, even when valid temperature data temporarily cannot be acquired, it is possible to avoid interrupting the control of a heat dissipation fan by using temperature data acquired in the past.

Further, the controller may stop or decelerate the operation of a heat dissipation fan based on temperature data after a predetermined period of time elapses since temperature data was last acquired.

According to the above-described configuration, the heat dissipation of a solid-state storage device by a heat dissipation fan is stopped or reduced when the period of time during which the solid-state storage device does not operate and therefore generates no heat is equal to or longer than a predetermined period of time. This makes it possible to avoid an unnecessary operation of the heat dissipation fan.

Further, the controller may stop or decelerate the control of a heat dissipation fan based on temperature data when the number of non-response times, which is the number of times no response to polling to a solid-state storage device is received, exceeds a predetermined number of times. This configuration makes it possible to easily determine the period of time during which a solid-state storage device does not operate and therefore generates no heat.

The above has described in detail the embodiment of the present invention with reference to the accompanying drawings. However, the specific configuration is not limited to that of the above-described embodiment, and includes designs and the like within the scope that does not depart from the gist of the present invention. Each configuration described in the above-described embodiment can be arbitrarily combined.

For example, as the identification information of the SSDs 33, MAC (Media Access Control) addresses may be used in place of the SSD serial numbers. Some of the devices, such as the USB connector 24, the audio system 25, and the network card 26, connected to the chipset 21 and the EC 31 in FIG. 1, and all or some of the input devices 27 may be omitted. Further, other devices may be connected to the information processing apparatus 10. In the case where the number of the SSD ports 32 is two or more, one SSD 33 may be installed for each of some of the SSD ports 32, and no SSD 33 may be installed for the remaining SSD ports 32. The number of processors provided in the information processing apparatus 10 is not limited to one or two, but may be three or more.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

10 . . . information processing apparatus; 11 . . . CPU; 12 . . . main memory; 13 . . . GPU; 14 . . . display; 21 . . . chipset; 22 . . . BIOS memory; 24 . . . USB connector; 25 . . . audio system; 26 . . . network card; 27 . . . input device; 28 . . . heat dissipation fan; 29 . . . power circuit; 31 . . . EC; 32 . . . SSD port; 33 . . . SSD; 112 . . . BIOS processing unit; 312 . . . reference table generation unit; 314 . . . temperature data acquisition unit; 316 . . . heat dissipation fan control unit; 332 . . . SSD controller; and 334 (334-1 to 334-3) . . . memory chip.

The invention claimed is:

1. An information processing apparatus comprising:
a processor;
a controller;
a solid-state storage device; and
a heat dissipation fan,
the processor and the controller being connected with the solid-state storage device by using a bus, and
the solid-state storage device being installed at a position corresponding to the heat dissipation fan,
wherein the processor:
acquires identification information of the solid-state storage device in association with location information indicating a position of the solid-state storage device, and
the controller:
acquires an identification number and a logical address of the solid-state storage device in advance,
configures a reference table by associating location information corresponding to the identification number acquired by the processor with a logical address corresponding to the identification number, and
at a time of acquiring temperature data indicating a temperature of the solid-state storage device and a logical address of the solid-state storage device, refers to the reference table to identify location information corresponding to the logical address from which the temperature data is transmitted, and controls, based on the temperature data, a heat dissipation fan corresponding to a position indicated by identified location information.

2. The information processing apparatus according to claim 1,
wherein the processor:
acquires the location information and the identification information at the time of starting its own operation, and
notifies the controller of the location information and the identification information, and
the controller:
transmits a polling packet to the solid-state storage device.

3. The information processing apparatus according to claim 2,
wherein the solid-state storage device:
includes a temperature sensor measuring a temperature of the solid-state storage device itself, and
responds to the controller with the temperature data indicating a measured temperature upon detection of the polling packet transmitted from the controller.

4. The information processing apparatus according to claim 1,
  wherein the controller:
    stores, in the reference table, acquired temperature data in association with the location information, and
    controls an identified heat dissipation fan based on temperature data stored in the reference table in a case where the temperature data cannot be acquired.

5. The information processing apparatus according to claim 4,
  wherein the controller:
    stops or decelerates an operation of the heat dissipation fan based on temperature data after a predetermined period of time elapses since temperature data was last acquired.

6. The information processing apparatus according to claim 5,
  wherein the controller:
    stops or decelerates control of the heat dissipation fan based on temperature data in the case where a number of non-response times, which is the number of times no response to polling to the solid-state storage device is received, exceeds a predetermined number of times.

7. A control method in an information processing apparatus including a processor, a controller, a solid-state storage device, and a heat dissipation fan, the processor and the controller being connected with the solid-state storage device by using a bus, and the solid-state storage device being installed at a position corresponding to the heat dissipation fan, the control method comprising:
  a first step in which the processor acquires identification information of the solid-state storage device in association with location information indicating a position of the solid-state storage device;
  a second step in which the controller acquires in advance an identification number and a logical address of the solid-state storage device, and configures a reference table by associating location information corresponding to an identification number acquired by the processor with a logical address corresponding to the identification number; and
  a third step in which, at a time of acquiring temperature data indicating a temperature of the solid-state storage device and a logical address of the solid-state storage device, the controller refers to the reference table to identify location information corresponding to the logical address from which the temperature data is transmitted, and controls a heat dissipation fan corresponding to a position indicated by identified location information based on acquired temperature data.

\* \* \* \* \*